(No Model.)
C. E. HINMAN & T. E. McCRACKEN.
MILK DELIVERY AND SHIPPING CAN.
No. 407,207. Patented July 16, 1889.
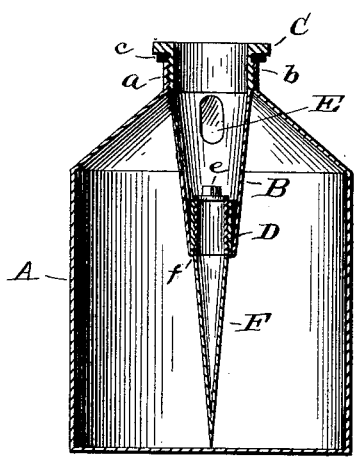
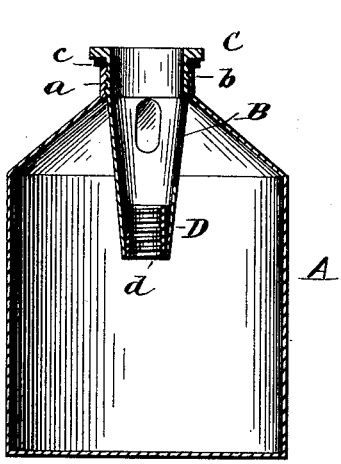
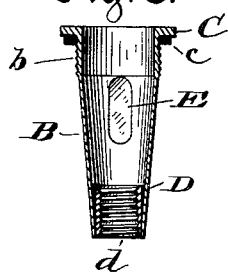
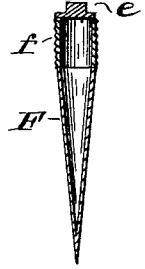
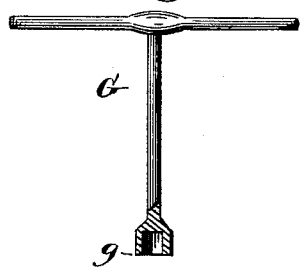
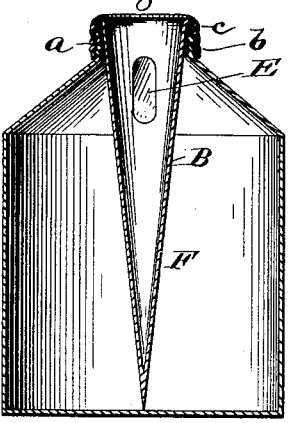
Witnesses
H. D. Nealy.
E. F. Drew
Inventors
Charles E. Hinman
Thomas E. McCracken
By their Attorney
M. D. Peck

UNITED STATES PATENT OFFICE.

CHARLES E. HINMAN AND THOMAS E. McCRACKEN, OF McCOOK, NEBRASKA, ASSIGNORS OF ONE-HALF TO WILLIAM O. RUSSELL, OF SAME PLACE, AND ANDREW J. PATE, OF DENVER, COLORADO.

MILK DELIVERY AND SHIPPING CAN.

SPECIFICATION forming part of Letters Patent No. 407,207, dated July 16, 1889.

Application filed May 13, 1889. Serial No. 310,626. (No model.)

*To all whom it may concern:*

Be it known that we, CHARLES E. HINMAN and THOMAS E. McCRACKEN, citizens of the United States, residing at McCook, in the county of Red Willow and State of Nebraska, have invented certain new and useful Improvements in Milk Delivery and Shipping Cans; and we do hereby declare the following to be a full, clear, and exact description of the invention, such as will enable others skilled in the art to which it appertains to make and use the same, reference being had to the accompanying drawings, which form part of this specification.

Our invention relates to that class of cans constructed especially for delivering milk to families, and for shipping in large quantities, by railway or otherwise, to distant points, and has for its object to provide a conical plug extending from the top to the bottom of the interior of the can in such a manner that when inserted in the can, substantially filled, the increasing size of the plug as it passes downward will compress the milk, so that it will completely fill all of the space within the can and crowd the globules downward and outward, and so pack them together as to render agitation or shaking of the milk impossible and keep the cream in the body of the milk while it is being carried in small or large vessels by any means of conveyance, and thereby preserve it in a sweet and wholesome state.

A further object of our invention is to provide a plug in two sections, the upper section of which may have a sight-opening or gage to aid in filling the can, and also to serve as a nozzle through which all the surplus or overflow milk can be poured off when the lower plug is inserted, and as a space in which the air can circulate, and serve as a receptacle in which ice or other cooling material can be placed when it is desired to lower the temperature of the milk, while the lower conical plug reaching to the bottom of the can is screwed into the upper and securely locked by means of a T-shaped key; and it consists in the construction hereinafter described, and more particularly pointed out in the claims.

Referring to the drawings, Figure 1 is a vertical sectional view through an ordinary milk-can and our improvement applied thereto. Fig. 2 is a like section with the lower part of the conical plug removed. Fig. 3 is a vertical section of the upper portion of the conical plug removed from the can. Fig. 4 is a like section of the lower conical plug, and Fig. 5 is a part sectional view of a key adapted to place the plug, and Fig. 6 is a slightly-modified form of the entire plug.

Like letters of reference refer to corresponding parts in each figure of the drawings.

A represents an ordinary milk-can formed of sheet metal with a conical top, having an internal screw-threaded flange *a* extending upward therefrom. Within the flange of the conical top there is inserted an inverted-cone-shaped hollow plug B, that is opened at each end and extends downward to about midway the interior of the can, which is made of tin, galvanized iron, or other suitable sheet metal. The upper end of this cone is extended by an externally-screw-threaded sleeve *b*, of brass, zinc, or other suitable metal, surrounded by a collar C on its upper end that extends outward over the top of the flange *a* of the can, which is screwed into the neck or flange *a* as the cone is lowered into the can. Under the collar C and upon the sleeve of the cone there is a gasket *c*, of rubber or other soft packing, to form a tight joint between the collar and upper edge of the neck or flange of the can when the cone B is fully screwed therein. Within the lower inner part of the cone B there is soldered or otherwise secured a sleeve D, of the same material as the one before described, having an internal screw-thread *d*, for the purpose hereinafter stated.

In the side of the upper edge of the cone B, just underneath the edge of the sleeve *b*, there is a sight-opening covered by a glass E, securely packed and fastened therein, so that it is air and water tight. The upper edge of this glass is arranged on the same plane with the converging upper edges of the conical top of the can to guide the eye in filling the can.

A closed extension-cone F is made to fit within the cone B and to extend to the bottom of the can, where it terminates in a point, thereby forming with the open cone B a substantially-continuous true taper of the cone from the top to the bottom of the can. On the upper end of the extension-cone F there is a cap $f$, of brass, zinc, or other suitable metal, having an external or male screw-thread on its sides to fit within the female screw of the sleeve D in the lower end of the cone B. A square stud $e$ is formed on the upper end of the cap to fit a socket $g$ on the end of a long shank G of a T-shaped key, by which the cone F is screwed into or out of place in the open cone.

The closed extension-cone F is made of the same material as the cone B, and is of a length so that its lower point will just reach the bottom of the can as its screw-cap is turned down into and seated within the sleeve D of the open cone, where, by a slight pressure of the key, it is locked as against any removal by manipulation during transit except by a suitable key, which is supposed to be only in the hands of the shipper and receiver or customer served with the milk.

We prefer to make the screw-threaded sleeve $b$ in the top of the open cone and the screw-cap $f$ on the extension-cone to screw in the same direction, so that when the extension-cone is being screwed down firmly to its seat the sleeve on the top of the open cone will be tightened down upon its gasket and made more firm to prevent its being removed by the hand while being carried from one point to another.

When the can has been filled, as the lower part of the closed extension-cone F is lowered through the bottom of the open cone, the milk slightly rises in the cone B until the screw-cap takes into the sleeve D, forming a tight joint, when, as the extension-cone is screwed downward by the key, the milk is compressed in the can.

The sleeve D may be of any desired length in the cone B, and the degree of compression depends on the distance the extension-cone is screwed into the sleeve after forming a tight joint.

The open cone B receives all of the overflow milk that is crowded out by the extension-cone, and serves the useful purpose of a nozzle for pouring the overflow milk off into a vessel without its running down upon the sides of the can and wasting after the cone F is inserted and the milk is compressed.

After the can has reached its destination a duplicate key is applied to the extension-cone, which is removed, taking the pressure off the milk, when, in large shipping-cans, the milk may be drawn out through a faucet near the bottom of the can, or in small cans for family-supply a suitable tool may be applied to the collar C and the open cone removed from the can, when the milk may be poured out. We do not, however, confine ourselves to the particular construction of a two-part cone extending to the bottom of the can, for the purpose set forth, as we may use a continuous cone formed in one piece with a sight-opening in its upper portion, the same as in the form before described, as illustrated in Fig. 6. In this construction we prefer to form the screw-thread on the outer side of the flange $a$ of the conical top of the can, and secure a downwardly-projecting internal screw-threaded sleeve $b$ to the upper edge of the compression-cone B, though this form of cone may be seated in the can, the same as the one before described, if desired.

In the modified form of cone the gasket $c$ is made to rest between the outer upper end of the cone B and the sleeve $b$, forming an air-tight joint with the top of the flange $a$ of the can when the sleeve is screwed down thereon. By the use of this form of compression-cone extending to the bottom of the can, the cream is held within the body of the compressed milk, and preserved from all agitation and kept sweet and pure while being carried to its destination, and, if desired, the can after being filled can be immersed in cool water without disturbing its contents until it is sent away.

Having thus fully described our invention, what we claim as new, and desire to secure by Letters Patent of the United States, is—

1. The combination, with a milk delivery and shipping can, of a conical displacement and compression plug extending from the top to the bottom of the interior of the can, said plug having a sight-opening in its upper part, the upper edge of the opening being on the same plane with the upper edge of the chamber of the can, as set forth.

2. The combination, with a can having a conical top, of a hollow conical displacement and compression plug open at one end extending from the top to the bottom of the interior of the can, said plug having a sight-opening with its upper edge on the same plane with the converging inner edges of the top of the can, and a screw-threaded sleeve on its upper end having a packing thereon, and fitting a screw-threaded flange extending from the top of the can, as set forth.

3. The combination, with a conical top, of a two-part conical plug extending from the top to the bottom of the can, the upper cone having a sight-opening at its upper edge, and open at each end and extending into the can from the top, and the lower or extension cone being secured within the lower end of the open cone and extending to the bottom of the can, as set forth.

4. The combination, with a can, of a two-part conical plug extending from the top to the bottom of the can, the upper cone being open and having a sight-opening in its side and a screw-threaded sleeve secured on its upper end working in a vertical flange of the can, and its lower end extending into the center of the can and provided with an internal screw-threaded sleeve, the lower or extension cone being closed and having a screw-cap on its upper end working within
5 the sleeve on the lower end of the upper cone, said screw-cap having a stud thereon for engaging with a key for operating the cone, as set forth.

In testimony whereof we affix our signatures in presence of two witnesses.

CHARLES E. HINMAN.
THOMAS E. McCRACKEN.

Witnesses:
A. C. EBERT,
THOS. GLASSCOTT.